United States Patent
Nagarajan et al.

(10) Patent No.: US 10,287,131 B2
(45) Date of Patent: May 14, 2019

(54) ELEVATOR DRIVE CONTROL TO PROTECT DRIVE COMPONENTS FROM MOISTURE

(71) Applicant: OTIS ELEVATOR COMPANY, Farmington, CT (US)

(72) Inventors: Prasanna Nagarajan, Farmington, CT (US); Ismail Agirman, Southington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 206 days.

(21) Appl. No.: 15/613,615

(22) Filed: Jun. 5, 2017

(65) Prior Publication Data

US 2018/0346285 A1 Dec. 6, 2018

(51) Int. Cl.
| | |
|---|---|
| *B66B 5/00* | (2006.01) |
| *F24F 11/30* | (2018.01) |
| *G05D 22/02* | (2006.01) |
| *F24F 110/20* | (2018.01) |
| *F24F 110/10* | (2018.01) |

(52) U.S. Cl.
CPC .......... *B66B 5/0018* (2013.01); *B66B 5/0087* (2013.01); *F24F 11/30* (2018.01); *G05D 22/02* (2013.01); *F24F 2110/10* (2018.01); *F24F 2110/20* (2018.01)

(58) Field of Classification Search
CPC .. B66B 5/0018; B66B 5/0087; F24F 2110/10; F24F 2110/20; G05D 22/00; G05D 22/02
USPC ................................. 187/391, 393
See application file for complete search history.

(56) References Cited

U.S. PATENT DOCUMENTS

| | | | |
|---|---|---|---|
| 3,931,454 A | 1/1976 | Sprengling | |
| 4,195,324 A * | 3/1980 | Waltz | H02K 15/125 318/436 |
| 5,631,509 A * | 5/1997 | Crowell | H02K 15/125 310/68 C |
| 8,220,590 B2 | 7/2012 | Chen et al. | |
| 2008/0012512 A1* | 1/2008 | Kawakami | B60K 6/365 318/143 |

(Continued)

FOREIGN PATENT DOCUMENTS

| | | |
|---|---|---|
| CN | 102285561 A | 12/2011 |
| CN | 103589320 A | 2/2014 |

(Continued)

OTHER PUBLICATIONS

The Extended European Search Report for EP Application No. 18173992.1, dated Oct. 24, 2018.

(Continued)

*Primary Examiner* — Jonathan Bradford
(74) *Attorney, Agent, or Firm* — Carlson, Gaskey & Olds

(57) ABSTRACT

An illustrative example method of maintaining an elevator drive includes determining whether a humidity condition near the elevator drive is outside a desired range. When the humidity condition is outside the desired range and the elevator drive is idle, reactive power is provided to at least one component of the elevator drive to increase a temperature of the at least one component without using the elevator drive to operate an associated elevator system.

20 Claims, 3 Drawing Sheets

(56) References Cited

U.S. PATENT DOCUMENTS

| | | | |
|---|---|---|---|
| 2010/0065380 A1* | 3/2010 | Chen | B66B 1/302 |
| | | | 187/290 |
| 2013/0110376 A1 | 5/2013 | Surnilla | |
| 2013/0132000 A1* | 5/2013 | Tamaki | G05B 23/0224 |
| | | | 702/35 |
| 2014/0130420 A1 | 5/2014 | Talonen | |
| 2015/0375962 A1 | 12/2015 | Hamlett et al. | |
| 2017/0077777 A1* | 3/2017 | Nam | H02K 5/10 |

FOREIGN PATENT DOCUMENTS

| | | |
|---|---|---|
| CN | 104073101 A | 10/2014 |
| CN | 204280939 U | 4/2015 |
| CN | 104961011 A | 10/2015 |
| EP | 0873913 A2 | 10/1998 |
| GB | 2450758 | 1/2009 |
| JP | H08324912 A | 12/1996 |
| JP | 2007062905 A | 3/2007 |
| JP | 2007223810 A | 9/2007 |
| JP | 2016222387 | 12/2016 |
| KR | 0167157 B1 | 12/1998 |

OTHER PUBLICATIONS

Variable Speed Drive (VSD) Enclosure Climate Control, Joliet Technologies, five pages, https://www.joliettech.com/blog/variable-speed-drive-vsd-enclosure-climate-control, printed Apr. 7, 2017.

\* cited by examiner

ELEVATOR DRIVE CONTROL TO PROTECT DRIVE COMPONENTS FROM MOISTURE

BACKGROUND

Elevator systems typically include a drive assembly that is responsible for the movement of the elevator car. Typical drives include a drive portion having electronics for controlling the power and command signals provided to a motor. Most arrangements include electric motors that cause desired movement of an elevator car responsive to the signals and power provided through the drive.

The electronic components of elevator drives may be housed in a cabinet or housing within a machine room or inside the hoistway. While the cabinet or housing provides some protection for the drive components, they are still subject to a variety of conditions that may have an adverse effect on the performance or longevity of the components or the drive. For example, humidity and temperature conditions may change in ways that potentially adversely affect at least some of the drive components.

One approach at protecting drive components has been to use a conformal coating on electrical components to protect them from moisture or chemical exposure. While such coatings are effective they add expense to the drive. Additionally if any of the coated components need testing the coating may have to be removed, which introduces additional expense.

It is necessary to protect elevator drive components from moisture and it would be beneficial to be able to accomplish that goal without needing a conformal coating.

SUMMARY

An illustrative example method of maintaining an elevator drive includes determining whether a humidity condition near the elevator drive is outside a desired range. When the humidity condition is outside the desired range and the elevator drive is idle, reactive power is provided to at least one component of the elevator drive to increase a temperature of the at least one component without using the elevator drive to operate an associated elevator system.

In an example method having one or more features of the method of the previous paragraph, providing reactive power to the elevator drive includes providing reactive power on an input and an output of the elevator drive.

In an example method having one or more features of the method of any of the previous paragraphs, providing reactive power to the elevator drive includes turning on the elevator drive in at least one of a converter d-axis control mode and an inverter d-axis control mode.

In an example method having one or more features of the method of any of the previous paragraphs, the at least one component comprises IGBTs.

In an example method having one or more features of the method of any of the previous paragraphs, the at least one component comprises a line reactor.

An example method having one or more features of the method of any of the previous paragraphs includes turning on a fan to direct airflow near the elevator drive while providing the reactive power to the elevator drive.

An example method having one or more features of the method of any of the previous paragraphs includes ceasing providing the reactive power to the elevator drive in response to the elevator drive being needed to operate the associated elevator system or the humidity condition changing to be inside the desired range.

An example method having one or more features of the method of any of the previous paragraphs includes determining a temperature near the elevator drive and determining whether the humidity is outside the desired range is based on the determined temperature.

In an example method having one or more features of the method of any of the previous paragraphs, the desired range for the determined humidity condition is different for different determined temperatures.

In an example method having one or more features of the method of any of the previous paragraphs, when the humidity condition is outside the desired range and the elevator drive is running to operate the associated elevator system, the method includes continuing to run the drive.

An illustrative example embodiment of an elevator drive assembly includes an elevator drive circuit including at least one passive component, a humidity sensor, and a controller that is configured to determine whether a humidity condition detected by the humidity sensor is outside a desired range. The controller will provide reactive power to at the least one passive component of the elevator drive to increase a temperature of the at least one passive component without using the elevator drive to operate an associated elevator system when the humidity condition is outside the desired range and the elevator drive is idle.

In an example elevator drive assembly having one or more features of the assembly of the previous paragraph, the controller provides reactive power to the elevator drive by providing reactive power on an input and an output of the elevator drive circuit.

In an example elevator drive assembly having one or more features of the assembly of any of the previous paragraphs, the controller provides reactive power to the elevator drive by turning on the elevator drive in at least one of a converter d-axis control mode and an inverter d-axis control mode.

In an example elevator drive assembly having one or more features of the assembly of any of the previous paragraphs, the at least one passive component comprises IGBTs.

In an example elevator drive assembly having one or more features of the assembly of any of the previous paragraphs, the at least one passive component comprises a line reactor.

An example elevator drive assembly having one or more features of the assembly of any of the previous paragraphs includes a fan situated to direct airflow near the elevator drive and the controller turns on the fan while providing the reactive power to the elevator drive circuit.

In an example elevator drive assembly having one or more features of the assembly of any of the previous paragraphs, the controller stops providing the reactive power to the elevator drive in response to the elevator drive being needed to operate the associated elevator system or the controller determining that the humidity condition changed to be inside the desired range.

An example elevator drive assembly having one or more features of the assembly of any of the previous paragraphs includes a temperature sensor that provides an indication of a temperature near the elevator drive circuit and the controller is configured to determine whether the humidity condition is outside the desired range based on the temperature.

In an example elevator drive assembly having one or more features of the assembly of any of the previous paragraphs, the desired range for the determined humidity condition is different for different determined temperatures.

In an example elevator drive assembly having one or more features of the assembly of any of the previous paragraphs, the controller is configured to continue to run the drive when the humidity condition is outside the desired range and the elevator drive is running to operate the associated elevator system.

The various features and advantages of at least one disclosed example embodiment will become apparent to those skilled in the art from the following detailed description. The drawings that accompany the detailed description can be briefly described as follows.

DETAILED DESCRIPTION

Example embodiments of this invention provide control over elevator drive components for protecting the drive components from environmental conditions, such as humidity or moisture without requiring a conformal coating or another treatment applied to the drive or its components.

Figure 1:
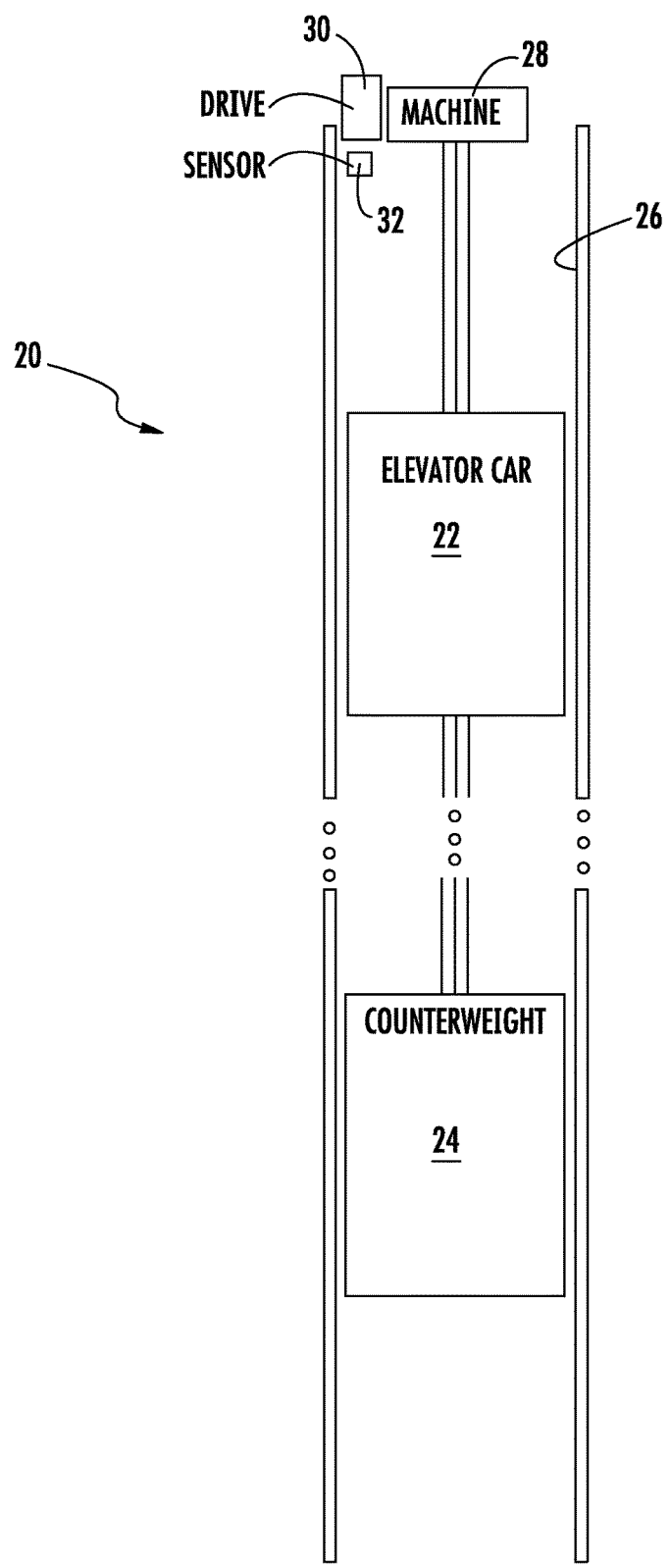
FIG. 1 schematically illustrates selected portions of an elevator system designed according to an embodiment of this invention.

FIG. 1 schematically illustrates selected portions of an elevator system 20. An elevator car 22 and counterweight 24 are situated for movement in a hoistway 26 in a known manner A machine 28 includes a motor for moving the elevator car 22 and a brake for holding the elevator car 22 at a landing where elevator service is needed. A drive 30 controls operation of the machine 28 in a known manner One type of traction-based elevator system is illustrated for discussion purposes but embodiments of this invention are useful in a variety of elevator system configurations.

A sensor 32 is situated near the drive 30 for sensing at least one environmental condition that may have an impact on at least a portion of the drive 30. In the illustrated embodiment, the sensor 32 is capable of sensing at least a humidity level in a vicinity of the sensor 32. In some embodiments the sensor 32 also senses temperature.

Figure 2:
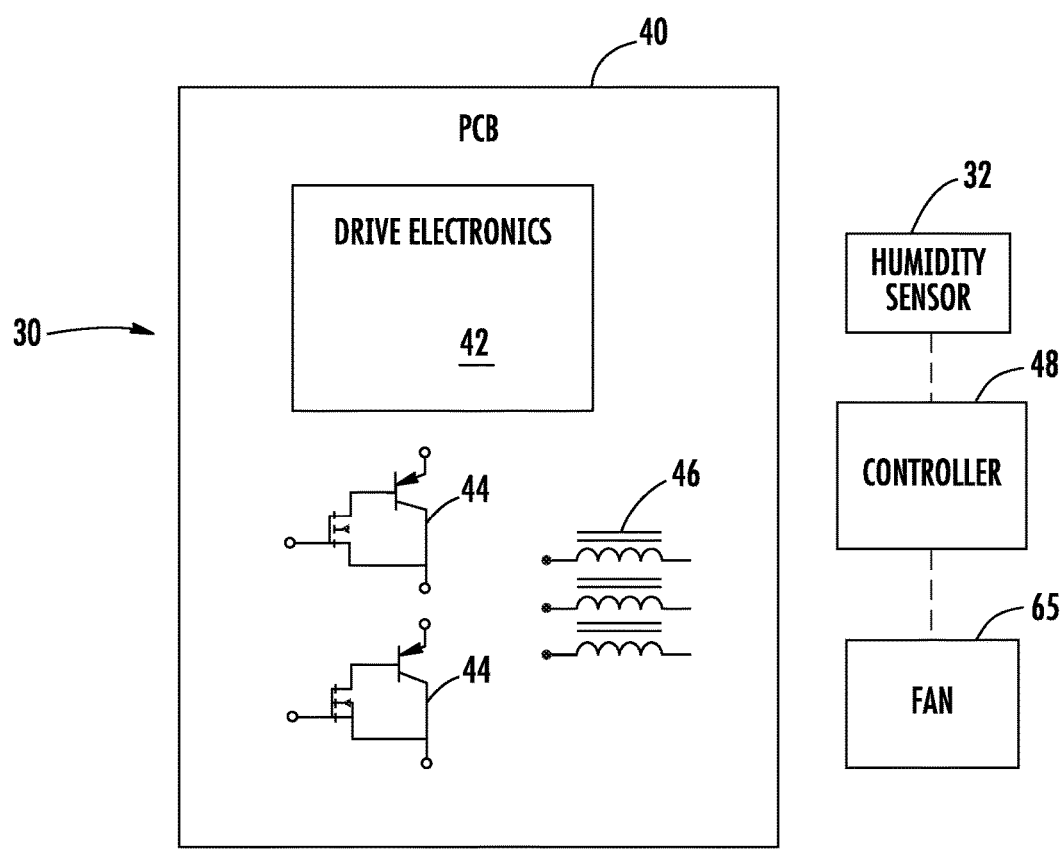
FIG. 2 diagrammatically illustrates selected features of an example elevator drive assembly designed according to an embodiment of this invention.

FIG. 2 schematically illustrates a drive assembly. The drive 30 in this example includes a printed circuit board (PCB) 40 that supports drive electronics represented at 42. The drive 30 includes insulated gate bipolar transistors (IGBTs) 44 and line reactors 46 for controlling current supply to the motor of the machine 28 in a known manner.

The drive assembly of FIG. 2 includes a controller 48 that uses information from the sensor 32 to control the drive 30 in a manner that is useful to reduce or eliminate at least some potentially negative environmental effects on the drive components. The controller 48 comprises at least one computing device, such as a microprocessor. Although schematically represented as a separate component, the controller 48 may be realized as a portion of a controller or computing device that is integrated as part of the drive 30.

Figure 3:
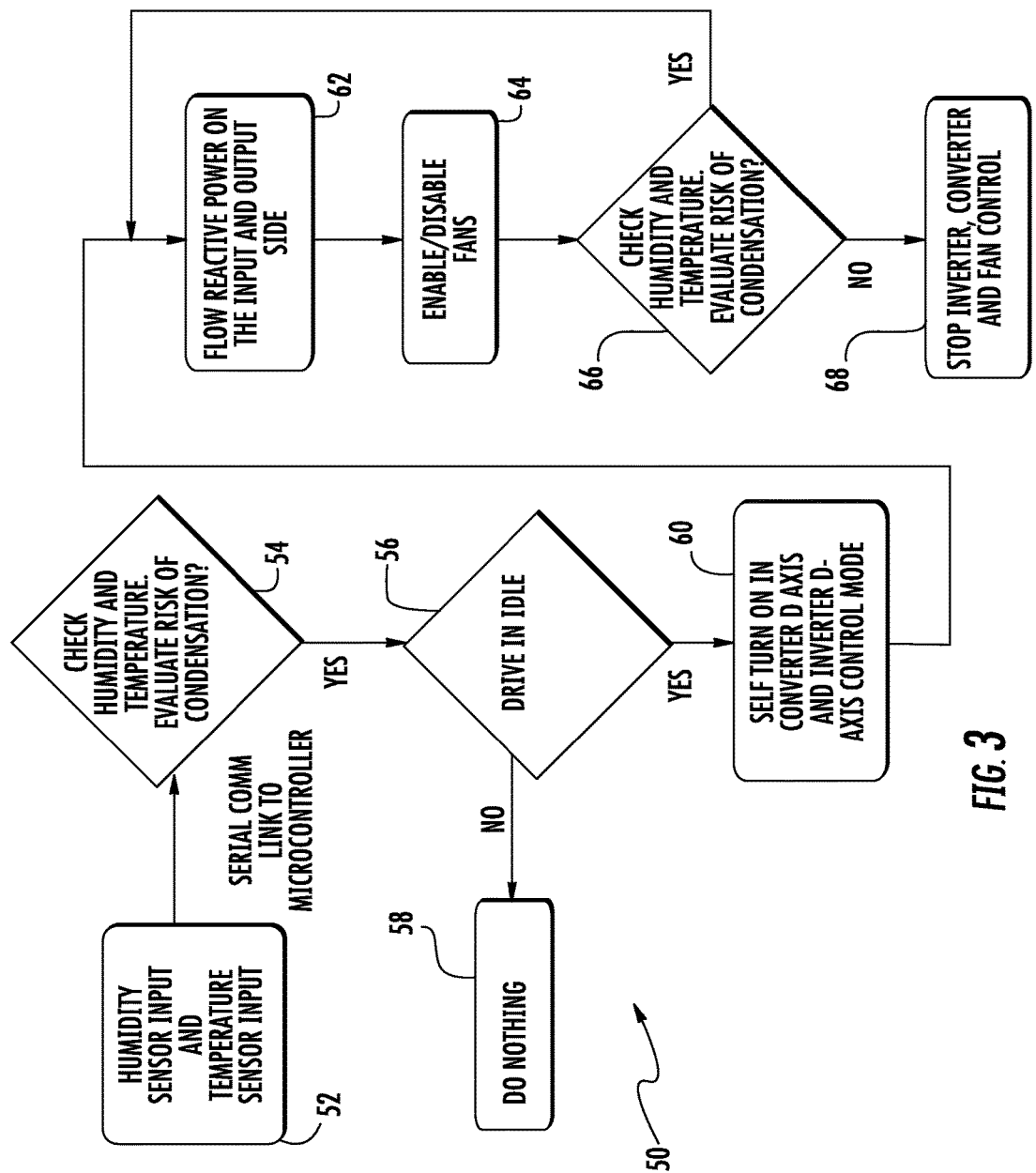
FIG. 3 is a flow chart diagram summarizing an example drive control technique designed according to an embodiment of this invention.

FIG. 3 is a flowchart diagram 50 summarizing an example embodiment of a control technique used by the drive assembly for protecting the drive components from adverse environmental conditions, such as humidity and moisture. At 52 the controller 48 receives an indication from the sensor 32 regarding at least the humidity in the area near the drive 30. The controller 48 is programmed or otherwise configured to determine whether the humidity level is within a desired or acceptable humidity range. The range may have various values or thresholds for different temperature conditions. The temperature used by the controller 48 may be an ambient temperature near the drive 30 or at least one temperature of at least one of the drive components.

At 54 the controller 48 determines if the detected humidity level is within the acceptable range. The controller 48 in some embodiments is configured to determine the range based only on the humidity indication. In such examples, the controller may have a preset range. The controller 48 uses a combination of humidity and temperature indications in other embodiments for determining whether the sensed humidity is in an acceptable range or if the controller 48 should take some action to avoid or at least reduce condensation on the drive 30. For example, the temperature indication from the sensor 32 may be such that a lower humidity threshold is appropriate for determining if condensation is likely. Under other temperature conditions a higher humidity reading from the sensor 32 may be acceptable. In such embodiments determining whether the humidity is outside the acceptable range is at least partially based on the temperature information provided by the sensor 32.

When the humidity level is outside the acceptable range the controller 48 determines whether the drive 30 is currently operating to cause movement of the elevator car 22 or if the drive 30 is idle at 56. When the drive 30 is operating (i.e., not idle) the controller 48 does not do anything in response to the humidity level as shown at 58. Similarly, if the determination at 54 indicates that the humidity level is in the acceptable or desired range, then the controller 48 does not do anything.

If the drive is idle at 56 the controller 60 automatically turns on at least a portion of the drive 30. In this example the controller initiates a converter d-axis and inverter d-axis control mode of the drive. Known field orientation control techniques are used in some embodiments to realize the d-axis control mode. Controlling at least the converter and the inverter of the drive 30 in a d-axis control mode allows for flowing reactive power to at least selected components of the drive 30 as shown at 62. In the illustrated example the controller 48 causes current to flow through at least one of the IGBTs 44 or at least one line reactor 46. The reactive power in such a control mode does not cause the drive 30 to operate the machine 28 but, instead, allows for current flow in a passive mode through passive components, such as the IGBTs 44 and the line reactor 46.

The current flowing at 62 results in heat generation that is effective to increase a temperature of at least some portions of the drive 30 to prevent moisture build up or condensation on components of the drive that are susceptible to damage or compromised performance if exposed to moisture. The resulting heat provides protection against moisture or high humidity conditions for such components without requiring expensive coatings on such components.

In the illustrated example, the controller 48 turns on at least one fan 65 (FIG. 2) to assist in protecting the drive 30. The fan 65 may be a portion of the drive assembly that is used in some conditions to cool portions of the drive 30 or may be a dedicated fan for moving air near the drive to assist in distributing the heat generated by the reactive power current provided in response to the humidity determination at 54. The fan 65 may also be effective at removing moisture or drying it if any moisture collects or condensation forms on portions of the drive 30. Operating the fan 65 in this embodiment is an optional feature and the controller 48 is programmed or otherwise configured to determine when fan operation is desired or needed.

At 66 the controller 48 determines if the humidity level is still outside the acceptable range. That determination is based on sensed temperature and humidity information in some embodiments. If so, the controller 48 continues supplying reactive power current to one or more of the components of the drive 30 to continue generating heat. Once the humidity level is back to an acceptable level, at 68 the controller 48 stops the reactive power and turns off the fan 65 if the fan was activated.

Although not specifically illustrated as a step in the flowchart 50, the controller 48 determines if the drive becomes active or should start operating while the reactive power is on at 62. If that occurs, the controller 48 turns off the supply of reactive power and waits until the drive 30 becomes idle again before taking further action for moisture control under humid conditions.

The drive assembly and control technique of the example embodiment provide control over condensation and moisture exposure for an elevator drive in an economical manner that does not interfere with typical elevator system operation and that can be implemented without requiring redesign of an elevator drive.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of maintaining an elevator drive, the method comprising:
   determining whether a humidity condition near the elevator drive is outside a desired range; and
   when the humidity condition is outside the desired range and the elevator drive is idle, providing reactive power to at least one component of the elevator drive to increase a temperature of the at least one component without using the elevator drive to operate an associated elevator system.

2. The method of claim 1, wherein providing reactive power to the elevator drive includes providing reactive power on an input and an output of the elevator drive.

3. The method of claim 1, wherein providing reactive power to the elevator drive includes
   turning on the elevator drive in at least one of a converter d-axis control mode and an inverter d-axis control mode.

4. The method of claim 1, wherein the at least one component comprises IGBTs.

5. The method of claim 1, wherein the at least one component comprises a line reactor.

6. The method of claim 1, comprising
   turning on a fan to direct airflow near the elevator drive while providing the reactive power to the elevator drive.

7. The method of claim 1, comprising ceasing providing the reactive power to the elevator drive in response to the elevator drive being needed to operate the associated elevator system or the humidity condition changing to be inside the desired range.

8. The method of claim 1, comprising
   determining a temperature near the elevator drive; and
   wherein determining whether the humidity is outside the desired range is based on the determined temperature.

9. The method of claim 8, wherein the desired range for the determined humidity condition is different for different determined temperatures.

10. The method of claim 1, wherein when the humidity condition is outside the desired range and the elevator drive is running to operate the associated elevator system, the method includes continuing to run the drive.

11. An elevator drive assembly, comprising:
    an elevator drive circuit including at least one passive component;
    a humidity sensor; and
    a controller that is configured to:
       determine whether a humidity condition detected by the humidity sensor is outside a desired range; and
       provide reactive power to the at least one passive component of the elevator drive to increase a temperature of the at least one passive component without using the elevator drive to operate an associated elevator system when the humidity condition is outside the desired range and the elevator drive is idle.

12. The assembly of claim 11, wherein the controller provides reactive power to the elevator drive by providing reactive power on an input and an output of the elevator drive circuit.

13. The assembly of claim 11, wherein the controller provides reactive power to the elevator drive by turning on the elevator drive in at least one of a converter d-axis control mode and an inverter d-axis control mode.

14. The assembly of claim 11, wherein the at least one passive component comprises IGBTs.

15. The assembly of claim 11, wherein the at least one passive component comprises a line reactor.

16. The assembly of claim 11, comprising
    a fan situated to direct airflow near the elevator drive; and
    wherein the controller turns on the fan while providing the reactive power to the elevator drive circuit.

17. The assembly of claim 11, wherein the controller stops providing the reactive power to the elevator drive in response to the elevator drive being needed to operate the associated elevator system or the controller determining that the humidity condition changed to be inside the desired range.

18. The assembly of claim 11, comprising
    a temperature sensor that provides an indication of a temperature near the elevator drive circuit; and
    wherein the controller is configured to determine whether the humidity condition is outside the desired range based on the temperature.

19. The assembly of claim 18, wherein the desired range for the determined humidity condition is different for different determined temperatures.

20. The assembly of claim 11, wherein the controller is configured to continue to run the drive when the humidity condition is outside the desired range and the elevator drive is running to operate the associated elevator system.

* * * * *